US009559942B2

(12) United States Patent
Kuo et al.

(10) Patent No.: US 9,559,942 B2
(45) Date of Patent: Jan. 31, 2017

(54) MEDIA STREAM PROVIDING DEVICE AND METHOD FOR CONNECTING THERETO, MEDIA STREAMING SYSTEM, AND COMPUTER-READABLE MEDIUM

(71) Applicant: VIVOTEK INC., New Taipei (TW)

(72) Inventors: Chia-Ming Kuo, New Taipei (TW); Wei-Tung Chang, New Taipei (TW)

(73) Assignee: VIVOTEK, INC., New Taipei (TW)

( * ) Notice: Subject to any disclaimer, the term of this patent is extended or adjusted under 35 U.S.C. 154(b) by 69 days.

(21) Appl. No.: 14/470,669

(22) Filed: Aug. 27, 2014

(65) Prior Publication Data
US 2015/0117264 A1 Apr. 30, 2015

(30) Foreign Application Priority Data

Oct. 30, 2013 (TW) .............................. 102139335 A

(51) Int. Cl.
*H04L 12/721* (2013.01)
*H04L 12/26* (2006.01)
(Continued)

(52) U.S. Cl.
CPC .......... *H04L 45/22* (2013.01); *H04L 65/1069* (2013.01); *H04L 65/4084* (2013.01); *H04L 65/80* (2013.01); *H04L 43/0852* (2013.01)

(58) Field of Classification Search
None
See application file for complete search history.

(56) References Cited

U.S. PATENT DOCUMENTS 5,948,069 A * 9/1999 Kitai ....................... H04L 29/06
370/409
7,187,658 B2 * 3/2007 Koyanagi ........... H04L 12/5692
370/254

(Continued)

FOREIGN PATENT DOCUMENTS

TW 200812317 A 3/2008
TW 200908655 A 2/2009

(Continued)

OTHER PUBLICATIONS

Intellectual Property Office, Ministry of Economic Affairs, R.O.C., "Office Action", Aug. 20, 2015, Taiwan.

*Primary Examiner* — Ayaz Sheikh
*Assistant Examiner* — Tarell Hampton
(74) *Attorney, Agent, or Firm* — Maschoff Brennan

(57) ABSTRACT

Disclosed herein, among others, is a media streaming system, comprising a registrar server, a media stream providing device, and a media stream receiving device. The registrar server is configured to register a piece of connection information associated with the media stream providing device, the connection information comprising a local network location, a public network location, a broker location, and a proxy location. The media stream receiving device is configured to obtain the connection information from the registrar server, and to commence measuring simultaneously, based on the aforementioned locations, first, second, third, and fourth costs for connecting to the media stream providing device via a local path, a remote path, a peer-to-peer path, and a proxy-assisted path, respectively. The media stream receiving device then selects one of those paths based on the measured costs.

12 Claims, 3 Drawing Sheets

(51) Int. Cl.
*H04L 12/707* (2013.01)
*H04L 29/06* (2006.01)

(56) References Cited

U.S. PATENT DOCUMENTS

| | | | | |
|---|---|---|---|---|
| 7,336,613 | B2* | 2/2008 | Lloyd | H04L 12/2602 370/232 |
| 7,707,271 | B2* | 4/2010 | Rudkin | H04L 65/605 370/401 |
| 7,826,381 | B1* | 11/2010 | Kastuar | H04L 12/4641 370/242 |
| 9,215,161 | B2* | 12/2015 | McGee | H04L 45/00 |
| 2002/0004826 | A1* | 1/2002 | Waite | H04L 29/12066 709/223 |
| 2004/0122952 | A1* | 6/2004 | Kistler | H04L 12/5692 709/227 |
| 2006/0159085 | A1* | 7/2006 | Lee | H04L 12/5693 370/389 |
| 2006/0215666 | A1* | 9/2006 | Shepherd | H04L 45/04 370/400 |
| 2010/0153770 | A1 | 6/2010 | Lee et al. | |
| 2010/0262709 | A1* | 10/2010 | Hiie | H04L 12/1827 709/231 |
| 2011/0055622 | A1* | 3/2011 | Arai | G06F 11/2025 714/4.2 |
| 2011/0271002 | A1* | 11/2011 | Martinez | H04L 65/4084 709/231 |
| 2011/0319075 | A1* | 12/2011 | Sharma | H04W 4/14 455/432.2 |
| 2013/0149994 | A1* | 6/2013 | Gaddam | H04L 41/069 455/406 |

FOREIGN PATENT DOCUMENTS

| | | |
|---|---|---|
| TW | 201318464 A1 | 5/2013 |
| TW | 201320746 A1 | 5/2013 |

* cited by examiner

MEDIA STREAM PROVIDING DEVICE AND METHOD FOR CONNECTING THERETO, MEDIA STREAMING SYSTEM, AND COMPUTER-READABLE MEDIUM

CROSS-REFERENCE TO RELATED APPLICATIONS

This non-provisional application claims priority under 35 U.S.C. §119(a) on Patent Application No. 102139335 filed in Taiwan, R.O.C. Oct. 30, 2013, the entire contents of which are hereby incorporated by reference.

TECHNICAL FIELD

The present invention relates to media streaming, particularly to a system of devices providing and receiving media streams, and a method for connecting the devices via various paths.

BACKGROUND

The amateurization of networked photographic equipment, or the prevalence of multifunctional video software such as VLC Media Player, has empowered a growing number of people to become content providers. Meanwhile, the Internet architecture based on TCP/IP (Transmission Control Protocol/Internet Protocol) has been so intricately developed that in the wake of the ubiquity of routers capable of network address translation (NAT), it is still frustrating for the public to configure a device on a local area network (LAN) in such a way that the device is able to passively accept connection from outside the LAN. Consider an IP camera, whose real-time image output is typically advertised as accessible anytime, anywhere after successful installation of the camera and configuration of port forwarding in the router. If, however, the camera is on a LAN, and the user is not authorized to administrate the router or firewall of the LAN or does not even know what a LAN is, the advertised benefits are by all means an illusion. Even if there were some NAT traversal mechanism in place or proxy or relay servers set up for the camera and the corresponding image receiving device, there would be no guarantee of stable establishment of a peer-to-peer or point-to-point connection, not to mention the significant amount of time wasted attempting the optimal mode of connection over and over again.

SUMMARY

In light of the above, and particularly to reduce the lead time of connection establishment, the present invention discloses a media stream providing device (hereinafter "providing device") and a method for connecting thereto, a media streaming system, and a computer-readable medium. Specifically, the present invention simultaneously measure four possible modes of connection in order to find the best network path by parallel comparison.

In the method disclosed, a piece of connection information associated with the providing device is obtained from a registrar server. The connection information comprises a location network location, a public network location, a broker server location, and a proxy server location. At a point in time, measurement of a first cost for connecting to the providing device via a local path is commenced based on the local network location. At the same point in time, measurement of a second cost for connecting to the providing device via a remote path is commenced based on the public network location. At the same point in time, measurement of a third cost for connecting to the providing device via a peer-to-peer path is commenced based on the broker server location. At the same point in time, measurement of a fourth cost for connecting to the providing device via a proxy-assisted path is commenced based on the proxy server location. One of the paths is selected based on the costs in order that the providing device be connected to.

The media streaming system disclosed comprises the providing device, the registrar server, and a media stream receiving device (hereinafter "receiving device"). The registrar server is configured to register the connection information associated with the providing device. The receiving device is configured to execute the disclosed method, namely to obtain the connection information from the registrar server, and to commence measuring at the point in time the costs for connecting to the providing device via the local, remote, peer-to-peer, and proxy-assisted paths, based on the local network location, the public network location, the broker server location, and the proxy server location, respectively. Based on the costs, the receiving device selects one of the paths to connect to the providing device.

The computer-readable medium disclosed has program code for causing a processor to execute a plurality of instructions, which comprise the steps of the disclosed method.

The providing device disclosed is configured to passively accept connection from the receiving device. The providing device comprises local, peer-to-peer, and proxy connection modules and a registering module. The local connection module is configured to obtain the local network location. The peer-to-peer connection module is configured to establish connection with a broker server having the broker server location. The proxy connection module is configured to establish connection with a proxy server having the proxy server location. The registering module is configured to register with the registrar server the connection information associated with the providing device, though the connection information may not necessarily comprise the public network location at the instant of registration.

In short, the providing device has already the local network location as it prepares to accept connection, and its public channel is known to the broker and proxy servers. The providing device registers its connection information with the registrar server, which appends the providing device's public network location to the connection information. The connection information obtained, the receiving device conducts simultaneous tests of connecting to the providing device via the local, remote, peer-to-peer, and proxy-assisted paths, and selects one of them based on the respective costs for transmission of media streams.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
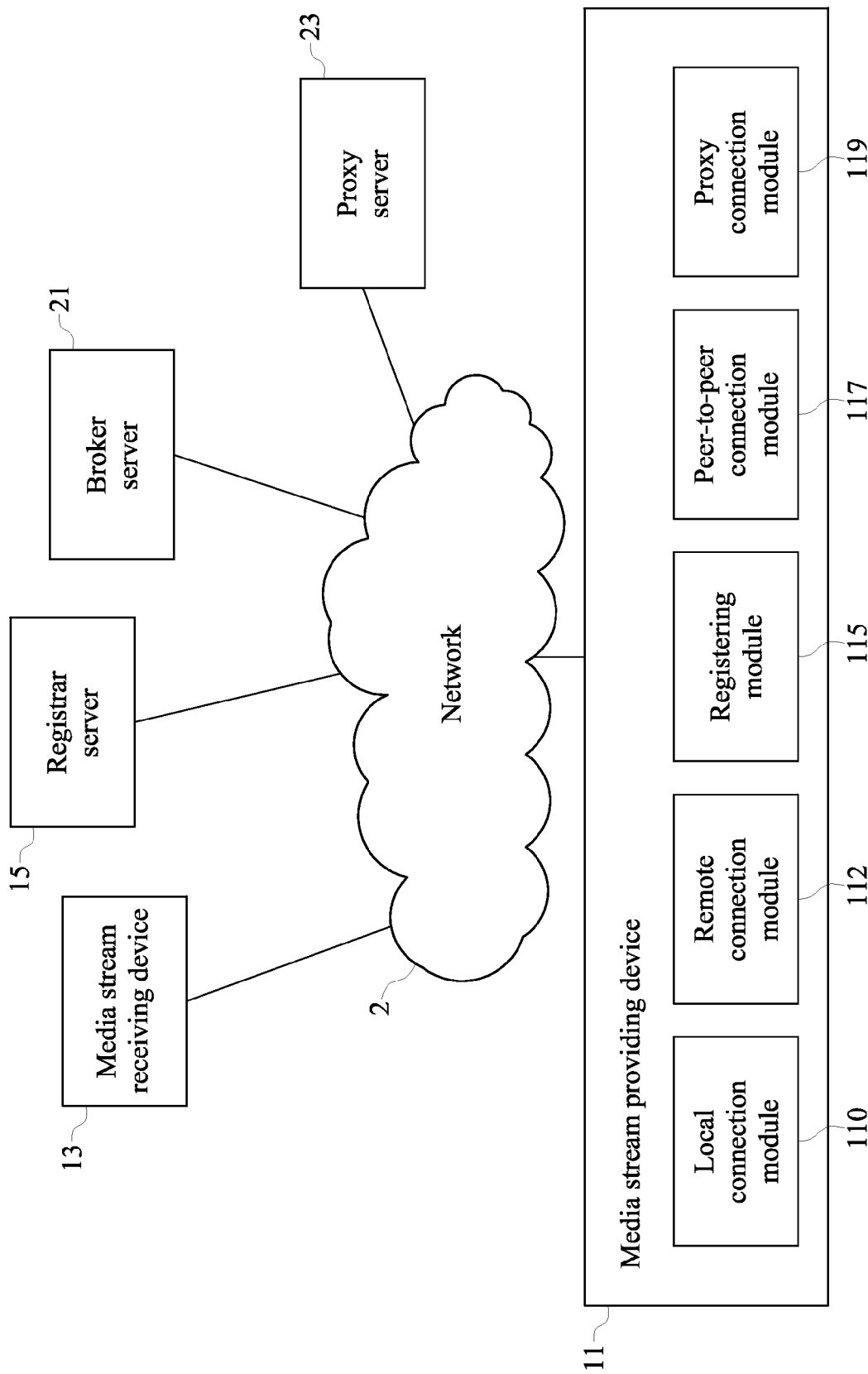
FIG. 1 is a high-level block diagram of a media streaming system comprising a media stream providing device, in accordance with an embodiment of the present invention.

Please refer to FIG. 1. As shown in the block diagram, a media streaming system according to an embodiment of the present invention comprises a media stream providing device 11 (hereinafter "providing device"), a media stream receiving device 13 (hereinafter "receiving device"), and a registrar server 15, the three 11, 13, and 15 communicating with each other through a network 2. The network 2 may be a local area network (LAN), a wide area network, or an amalgam of both, and is not limited to wired or wireless physical links. Through the network 2, all the members 11, 13, and 15 of the media streaming system are also able to connect to a broker server 21 and a proxy server 23. The three servers 15, 21, and 23 are different in function, but in practice the latter two 21 and 23 may be implemented together, may be part of the media streaming system, and may be integrated with the registrar server 15 as a single piece of equipment, a group of servers, a cluster, or a cloud. Put simply, the broker server 21 intermediates, causing the providing device 11 and the receiving device 13 to establish a direct peer-to-peer connection for transmission of media streams, whereas the proxy server 23 is additionally charged with relaying or forwarding the media streams. A proxy-assisted path established through the proxy server 23 is bound to comprise the proxy server 23.

Figure 2:
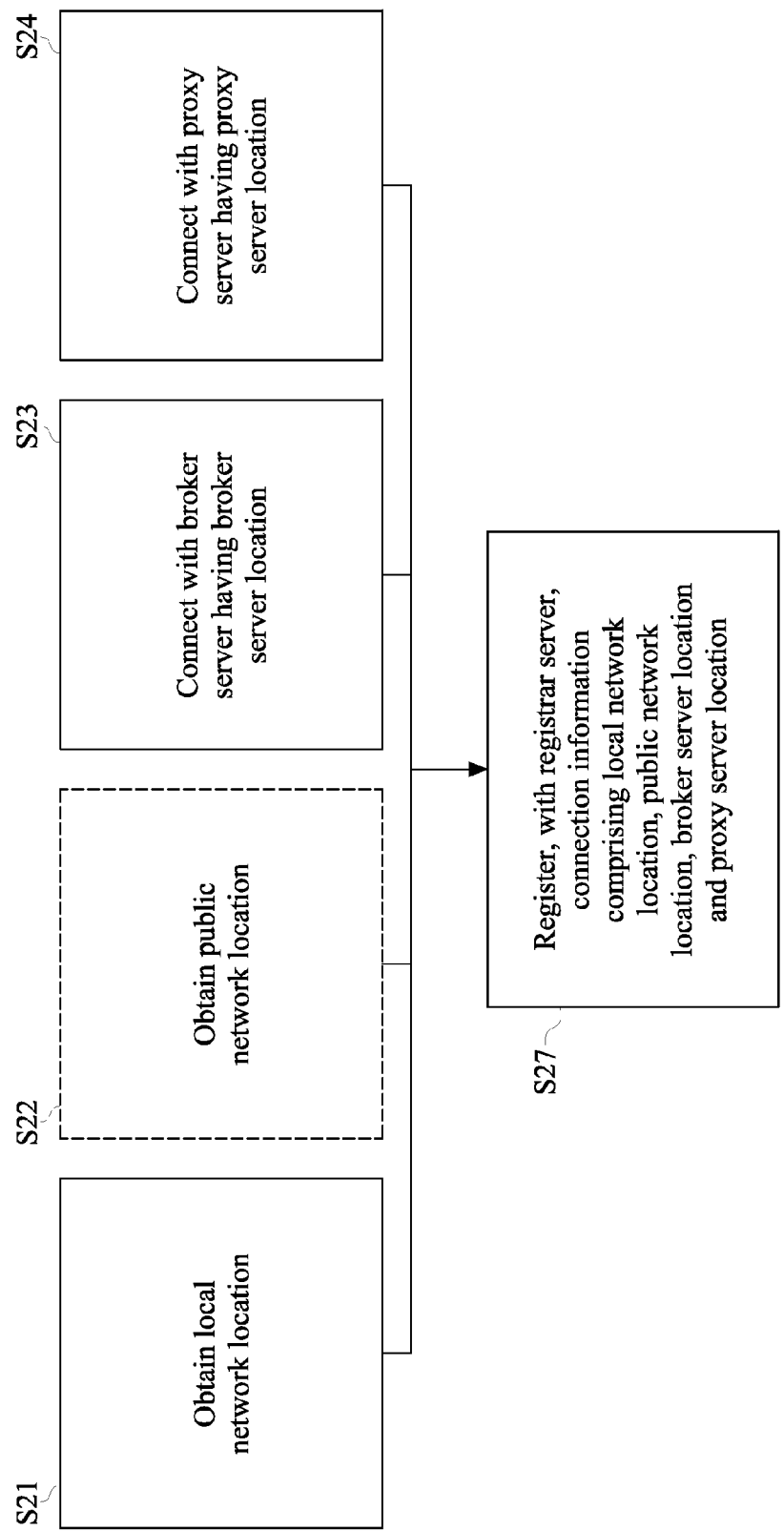
FIG. 2 is a flowchart of a media stream providing device preparing connectivity, in accordance with an embodiment of the present invention.

The providing device 11 may be an IP (Internet Protocol) camera, a network video recorder, a network video server, a piece of video management software (VMS), or the like. The providing device 11 comprises a local connection module 110, a remote connection module 112, a registering module 115, a peer-to-peer connection module 117, a proxy module 119. Please refer to FIG. 2, a flowchart of the providing device 11 preparing connectivity in an embodiment of the present invention, for an illustration of the workings of the modules 110, 112, 115, 117, and 119. Steps S21 to S24 are in no absolute order; as shown in FIG. 2, they may in fact be performed simultaneously. In step S21, the local connection module 110 obtains a local network location. Suppose that the providing device 11 is located on a LAN. The local network location may then be an IP address issued by the LAN's gateway or router through, say, Dynamic Host Configuration Protocol (DHCP) to and at the request of the providing device 11. Suppose otherwise that the providing device 11 is able to connect directly with the data center of an Internet service provider (ISP). In contrast to the local network location, a public network location may then be a public IP address provided by the ISP. Please note that in actual usage a network location may further comprise elements such as protocol identification and port numbering. In step S22, the remote connection module 112 obtains the public network location. Suppose again that the providing device 11 is on a LAN. The public network location may then be a public IP address of a publically accessible router of the LAN, along with a port assigned by the providing device 11 in its UPnP (Universal Plug and Play) port forwarding configuration directed toward the router. Step S22 is optional.

In step S23, the peer-to-peer connection module 117 establishes connection between the providing device 11 and the broker server 21. Suppose that the providing device 11 is behind a router. Due to network address translation (NAT), the local network location in the packets by which the peer-to-peer connection module 117 communicates with the broker server 21 is replaced with a public network location (which may comprise an IP address and a port number) of the router. In return, the broker server 21 can then contact the providing device 11 at this public network location through the router, for instance when referring some receiving device 13. The connection between the providing device 11 and the broker server 21 generally needs to be maintained at all times (e.g. by the providing device 11 periodically sending 'keepalive' packets to the broker server 21). Step S24, similar to step S23, is the proxy connection module 119 establishing connection between the providing device 11 and the proxy server 23.

In step S27, the registering module 115 registers with the registrar server 15 a piece of connection information associated with the providing device 11. The connection information comprises said local network location, the public network location (if step S22 has been executed), and the locations of the employed servers 21 and 23. The broker server location and the proxy server location are usually also network locations that may comprise IP addresses and port numbers. The providing device 11 may be given in advance or may obtain from the registrar server 15 a list comprising connection information associated with at least one broker server and at least one proxy server, picking the servers 21 and 25 in steps S23 and S24. Inasmuch as the connection information registered in association with the providing device 11 is to be utilized by the receiving device 13, if the receiving device 13 also has access to the list, the broker and proxy server locations may simply be contents of an indexing field in the list, e.g. server hostname.

Figure 3:
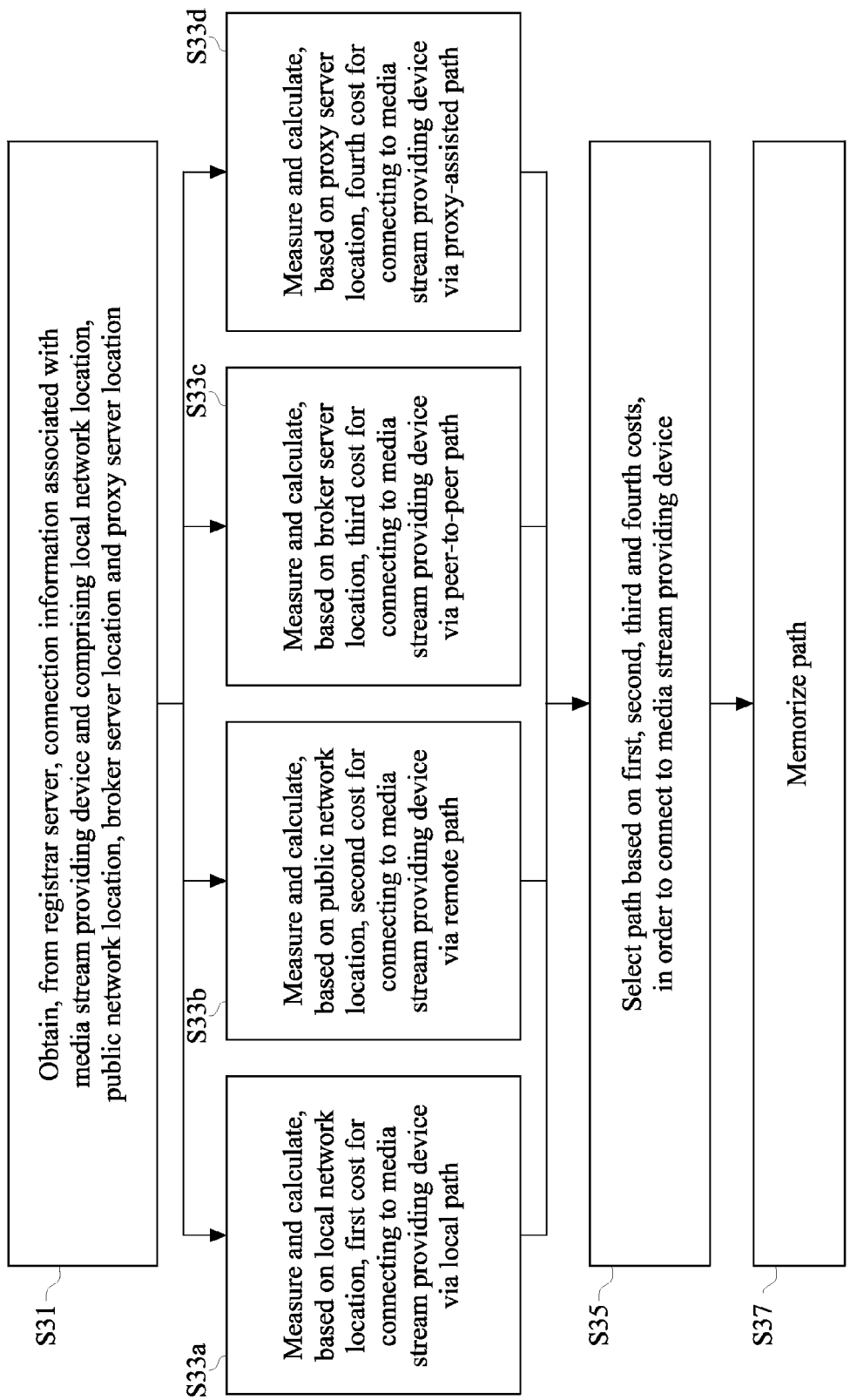
FIG. 3 is a flowchart of a method for connecting to a media stream providing device, in accordance with an embodiment of the present invention.

Please refer to FIG. 3, which illustrates according to an embodiment of the present invention a method for the receiving device 13 to connect to the providing device 11. In step S31, the receiving device 13 obtains from the registrar server 15 the connection information associated with the providing device 11. The connection information comprises the local and public network locations and the locations of the employed servers 21 and 23. Please note that if the providing device 11 has not disclosed its own public network location while registering with the registrar server 15, the registrar server 15, receiving post-NAT packets, may register the received and translated network address and port as the public network location of the providing device 11, and in turn provide the receiving device 13 with that public network location in step S31.

In steps S33a to S33d, the receiving device 13 simultaneously performs measurement and calculation of four connection costs. Specifically, in step S33a, the receiving device 13 attempts to connect to the providing device 11 at the obtained local network location. The path generated by the network 2 for this connection is called a local path, and the cost for the same is a first cost.

There are many aspects of a cost. A higher cost signifies a connection that is slower, less stable, more difficult, or with narrower bandwidth, whereas an enormous or infinite cost might represent that connection is entirely impossible. A cost may be calculated from at least one network measurement factor, which may be a bandwidth, a communication latency (such as a round-trip time), resources the broker or proxy server is able to allocate to a single media stream, or the like. A person skilled in the art should be readily capable of assembling and formulating the network measurement factor according to his needs.

In step S33b, the receiving device 13 attempts to connect to the providing device 11 at the obtained public network location. The path generated by the network 2 for this connection is called a remote path, and the cost for the same is a second cost. In step S33c, the receiving device 13 requests the broker server 21 having said broker server location to orient a connection toward the providing device 11. To illustrate, consider the Session Initiation Protocol (SIP) as an example, wherein the receiving device 13 specify the providing device 11 in an 'invite' message sent to the broker server 21. The broker server 21 forwards this invitation to the providing device 11 using the connection established previously in step S23. The devices 11 and 13 may, but not necessarily, predict the NAT port designation rules in the LANs on which they are each located, and inform each other through the broker server 21, thereby establishing a peer-to-peer connection between the both of them. The path generated by the network 2 for this connection is called a peer-to-peer path, and the cost for the same is a third cost. In step S33d, the receiving device 13 requests the proxy server 23 having said proxy server location to orient a connection toward the providing device 11. Unlike with the broker server 21, the devices 11 and 13 cannot communicate directly with each other as peers in a proxy-assisted connection, a consequence perhaps of the public connectivity of one or even both of the devices 11 and 13 being strictly controlled by routers. The path for the proxy-assisted connection is generated by the network 2, with the proxy server 23 in the middle, and the cost for the same is a fourth cost. All traffic to and from the devices 11 and 13 is mediated by and goes through the proxy server 23.

In step S35, based on said first, second, third, and fourth costs, the receiving device 13 selects a path from the local, remote, peer-to-peer, and proxy-assisted paths in order to connect to the providing device 11. The receiving device 13 usually selects the least costly path. As described above though, transmitting media streams with a proxy-assisted connection might end up appropriating a large amount of computing and networking resources of the proxy server 23. In one embodiment, therefore, the receiving device 13 refrains from utilizing the proxy-assisted path unless the fourth cost is significantly superior to the others (e.g. when the other modes of connection are infeasible with infinite costs). In step S37, the receiving device 13 may memorize the utilized path, thus not having to initiate frequently at step S31 the procedure for connecting to the providing device 11

In one embodiment, the providing device 11 may be always detecting any change to its own local and public network locations, etc, and promptly update its connection information with the registrar server 15.

To summarize, the present invention discloses a media streaming system comprising a providing device, a receiving device, and a registrar server. The providing device establishes backup connection with a broker server and a proxy server during installation, and registers its connection information with the registrar server. Based on the connection information, the receiving device commences measuring simultaneously costs for connecting to the providing device via local, remote, peer-to-peer, and proxy-assisted paths, in order to select and memorize the best media streaming path among them. Given that the measurements are conducted simultaneously, the present invention considerably reduces the lead time of attempting one by one various modes of connection.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A method for connecting to a media stream providing device, the method comprising:
   obtaining from a registrar server a piece of connection information associated with the media stream providing device, the connection information comprising a local network location, a public network location, a broker server location, and a proxy server location;
   commencing measuring via a media stream receiving device, at a point in time and based on the local network location, a first cost for connecting to the media stream providing device via a local path;
   commencing measuring via the media stream receiving device, at the point in time and based on the public network location, a second cost for connecting to the media stream providing device via a remote path;
   commencing measuring via the media stream receiving device, at the point in time and based on the broker server location, a third cost for connecting to the media stream providing device via a peer-to-peer path;
   commencing measuring via the media stream receiving device, at the point in time and based on the proxy server location, a fourth cost for connecting to the media stream providing device via a proxy-assisted path; and
   selecting via the media stream receiving device a path based on the first cost, the second cost, the third cost, and the fourth cost, in order to connect to the media stream providing device, the path being the local path, the remote path, the peer-to-peer path, or the proxy-assisted path.

2. The method of claim 1, further comprising memorizing the path via the media stream receiving device.

3. The method of claim 1, wherein the first cost, the second cost, the third cost, and the fourth cost constitute a set, the path being the local path when the first cost is lowest in the set, the path being the remote path when the second cost is lowest in the set, the path being the peer-to-peer path when the third cost is lowest in the set, the path being the proxy-assisted path when the fourth cost is lowest in the set.

4. The method of claim 1, further comprising:
   calculating via the media stream receiving device the first cost, the second cost, the third cost, and the fourth cost based on at least one network measurement factor, the network measurement factor being at least one element selected from a set consisting of a bandwidth, a communication latency, and a server resource allocation.

5. A media streaming system comprising:
   a media stream providing device;
   a registrar server configured to register a piece of connection information associated with the media stream providing device, the connection information comprising a local network location, a public network location, a broker server location, and a proxy server location; and a media stream receiving device configured to obtain the connection information from the registrar server; to commence measuring, at a point in time and based on the local network location, a first cost for connecting to the media stream providing device via a local path; to commence measuring, at the point in time and based on the public network location, a second cost for connecting to the media stream providing device via a remote path; to commence measuring, at the point in time and based on the broker server location, a third cost for connecting to the media stream providing device via a peer-to-peer path; to commence measuring, at the point in time and based on the proxy server location, a fourth cost for connecting to the media stream providing device via a proxy-assisted path; and to select a path based on the first cost, the second cost, the third cost, and the fourth cost, in order to connect to the media stream providing device, the path being the local path, the remote path, the peer-to-peer path, or the proxy-assisted path.

6. The media streaming system of claim 5, wherein the media stream receiving device is further configured to memorize the path.

7. The media streaming system of claim 5, wherein the first cost, the second cost, the third cost, and the fourth cost constitute a set, the path being the local path when the first cost is lowest in the set, the path being the remote path when the second cost is lowest in the set, the path being the peer-to-peer path when the third cost is lowest in the set, the path being the proxy-assisted path when the fourth cost is lowest in the set.

8. The media streaming system of claim 5, wherein the media stream receiving device is further configured to calculate the first cost, the second cost, the third cost, and the fourth cost based on at least one network measurement factor, the network measurement factor being at least one element selected from a set consisting of a bandwidth, a communication latency, and a server resource allocation.

9. A non-transitory computer-readable medium having program code for causing a processor to execute a plurality of instructions, the instructions comprising:

obtaining from a registrar server a piece of connection information associated with a media stream providing device, the connection information comprising a local network location, a public network location, a broker server location, and a proxy server location;

commencing measuring via a media stream receiving device, at a point in time and based on the local network location, a first cost for connecting to the media stream providing device via a local path;

commencing measuring via the media stream receiving device, at the point in time and based on the public network location, a second cost for connecting to the media stream providing device via a remote path;

commencing measuring via the media stream receiving device, at the point in time and based on the broker server location, a third cost for connecting to the media stream providing device via a peer-to-peer path;

commencing measuring via the media stream receiving device, at the point in time and based on the proxy server location, a fourth cost for connecting to the media stream providing device via a proxy-assisted path; and selecting via the media stream receiving device a path based on the first cost, the second cost, the third cost, and the fourth cost, in order to connect to the media stream providing device, the path being the local path, the remote path, the peer-to-peer path, or the proxy-assisted path.

10. The non-transitory computer-readable medium of claim 9, wherein the instructions further comprises memorizing the path via the media stream receiving device.

11. The non-transitory computer-readable medium of claim 9, wherein the first cost, the second cost, the third cost, and the fourth cost constitute a set, the path being the local path when the first cost is lowest in the set, the path being the remote path when the second cost is lowest in the set, the path being the peer-to-peer path when the third cost is lowest in the set, the path being the proxy-assisted path when the fourth cost is lowest in the set.

12. The non-transitory computer-readable medium of claim 9, wherein the instructions further comprises:

calculating via the media stream receiving device the first cost, the second cost, the third cost, and the fourth cost based on at least one network measurement factor, the network measurement factor being at least one element selected from a set consisting of a bandwidth, a communication latency, and a server resource allocation.

\* \* \* \* \*